_United States Patent_ [19]

Greenwood

[11] Patent Number: 4,768,398
[45] Date of Patent: Sep. 6, 1988

[54] CONTINUOUSLY-VARIABLE TRANSMISSION

[75] Inventor: C. J. Greenwood, Leyland, United Kingdom

[73] Assignee: Leyland Vehicles Limited, Leyland, United Kingdom

[21] Appl. No.: 131,251

[22] Filed: Dec. 7, 1987

Related U.S. Application Data

[63] Continuation of Ser. No. 781,918, Sep. 27, 1985, abandoned.

[30] Foreign Application Priority Data

Sep. 28, 1984 [GB] United Kingdom ............ 8424525

[51] Int. Cl.⁴ .................................... F16H 37/08
[52] U.S. Cl. ................................ 74/691; 74/681; 74/740
[58] Field of Search ............... 74/190, 200, 681, 682, 74/689, 691, 721, 740, 796, 687, 688, 690

[56] References Cited

U.S. PATENT DOCUMENTS

| | | | |
|---|---|---|---|
| 2,164,504 | 7/1939 | Dodge | 74/796 |
| 3,479,908 | 11/1969 | Kress et al. | 74/681 |
| 3,545,202 | 12/1970 | Schofield | 74/691 |
| 3,580,107 | 5/1971 | Orshansky | 74/687 |
| 3,714,845 | 2/1973 | Mooney, Jr. | 74/687 |
| 3,820,416 | 6/1974 | Kraus | 74/200 |
| 4,297,918 | 11/1981 | Perry | 74/796 |
| 4,402,237 | 9/1983 | Tomlinson | 74/681 |
| 4,569,251 | 2/1986 | Greenwood | 74/691 |
| 4,662,240 | 5/1987 | Greenwood | 74/681 |

FOREIGN PATENT DOCUMENTS

| | | | |
|---|---|---|---|
| 81696 | 6/1983 | European Pat. Off. | |
| 84724 | 8/1983 | European Pat. Off. | 74/691 |
| 2444204 | 7/1980 | France | |
| 2463335 | 3/1981 | France | 74/682 |
| 2100372 | 12/1982 | United Kingdom | 74/691 |
| 2136893 | 9/1984 | United Kingdom | 74/691 |

_Primary Examiner_—Leslie A. Braun
_Assistant Examiner_—David A. Testardi
_Attorney, Agent, or Firm_—Hayes, Davis & Soloway

[57] ABSTRACT

A driveline for an engined vehicle, comprises a continuously-variable ratio transmission (1) having an input, adapted to be driven by the engine, and an output (3) and first and second epicyclic gears (4, 10) for providing a high and low regime. The planet carrier (6) of the first epicyclic gear and the sun gear (12) of the second epicyclic gear are directly driven by the said output of the continuously-variable ratio transmission, and the sun gear (5) of the first epicyclic gear and the annulus (11) of the second epicyclic gear are directly driven by the engine, the annulus (7) of the first epicyclic gear providing an output in low regime, and the planet carrier (13) of the second epicyclic gear providing an output in high regime.

11 Claims, 2 Drawing Sheets

CONTINUOUSLY-VARIABLE TRANSMISSION

This is a continuation of application Ser. No. 781,918 filed on Sept. 27, 1985 now abandoned.

The present invention relates to continuously variable transmissions (often abbreviated to CVTs).

Continuously variable transmissions are transmissions which provide a continuous spread of transmission ratios between a given maximum and minimum. As such they are well suited for use as drivelines in vehicles which have to deliver a wide variety of torques, and are particularly suitable for use in vehicles, such as buses, which also benefit from running their engines at speeds substantially independent of vehicle speeds.

One known type of continuously variable transmission comprises a variator of the toroidal race rolling traction type, which receives an input from an engine shaft, and drives one input of an epicyclic gear train, a second input of which is driven directly by the engine, and the output of which provides the transmission output. This arrangement allows the transmission to move the vehicle away from stationary without the need for a clutch. If a greater speed range is required, a second epicyclic may be incorporated to allow the transmission to operate in two regimes, low and high.

In known transmissions of this kind, the epicyclic or epicyclics are arranged such that relatively large amounts of power are transmitted through the variator at low speeds, but as speed increases the power passing through the variator decreases. Since in normal use vehicles such as buses spend most of their operating time travelling at a cruising speed which is a substantial proportion of the top speed of the vehicle, the power transmitted through the variator is thus usually small.

Known continuously variable transmissions are, however, not suited to use in vehicles which spend a significant proportion of their lives developing power at low speeds. If a conventional CVT were used in a vehicle such as an agricultural tractor, for example, which spends much of its working life operating at low speeds but developing large torques at its driving wheels, the variator would have to be undesirably large as a result of its spending much of its time working in the part of its operating range in which a lot of power is passing through it.

According to the present invention there is provided a driveline for an engined vehicle, comprising a continuously-variable ratio transmission having an input, adapted to be driven by the engine, and an output and first and second epicyclic gears for providing a high and low regime, wherein the planet carrier of the first epicyclic gear and the sun gear of the second epicyclic gear are adapted to be driven by the said output of the continuously-variable ratio transmission, and the sun gear of the first epicyclic gear and the annulus of the second epicyclic gear are adapted to be driven by the engine, the annulus of the first epicyclic gear providing an output in low regime, and the planet carrier of the second epicyclic gear providing an output in high regime.

In an embodiment of the invention, the first and second epicyclic gears are mounted concentrically around an output shaft of the engine, which output shaft provides the drive for the input of the continuously-variable ratio transmission, the sun gear of the first epicyclic, and the annulus of the second epicyclic.

Reference will now be made, by way of example, to the accompanying drawings, in which.

Figure 1:
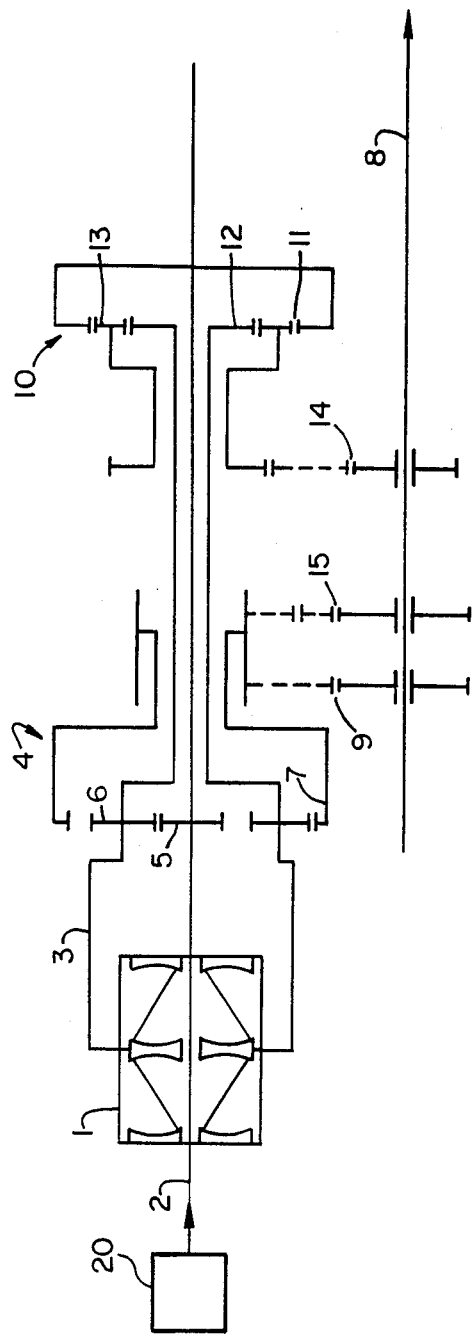
FIG. 1 shows a continuously variable transmission embodying the present invention.

FIG. 1 shows a continuously variable transmission embodying the invention for use in an agricultural tractor, for example. A variator 1 of the toroidal race-rolling traction type receives an input from an engine 20 by way of an engine output shaft 2, and provides an output via an output shaft 3. A first epicyclic 4 has its sun gear 5 driven by the engine shaft and its planet carrier 6 driven by the variator output shaft 3. The annulus 7 of the first epicyclic provides drive to a final drive shaft 8 in low regime, by way of gearing 9. A second, simple, epicyclic 10 has its annulus 11 driven by the engine shaft 2, and its sun gear 12 driven by the variator output shaft 3. The planet carrier 13 of the second epicyclic provides drive to the final drive shaft 8 in high regime, by way of gearing 14. In this example, the engine shaft 2 passes through the transmission system, thereby to provide a power take-off at its exposed end. The first epicyclic has, in this example, a second set of gears included in the planet system, providing a compound planet system in which the output planet rotates in the opposite direction into the input planet so as to render the ratio $R_{SA}$ positive (where $R_{SA} = [N_S/N_A]N_C = 0$ $N_S$, $N_A$ and $N_C$ are the speeds of rotation of the sun gear, the annulus and the planet carrier, respectively. This has been found to simplify the connections between the two epicyclics, the engine output shaft, and the variator.

The gearing 9 and the gearing 14 may be individually engaged, by clutches for example, with the final drive shaft 8, to allow the transmission to operate both in low and high regime. The annulus of the first epicyclic may also drive further gearing 15, also engagable and disengagable from the final drive shaft by means of another clutch, to provide a reverse gear in low regime.

In use, the gearing 9 is engaged to the final drive shaft 8, while the gearing 14 is disengaged. This puts the transmission in low regime. To hold the vehicle stationary, with the final drive shaft not rotating, the transmission ratio of the variator is set so that the planet carrier of the first epicyclic rotates at a speed which counterbalances the effect of the rotating sun gear, thereby causing no rotation to be transmitted to the annulus. To move off, the variator transmission ratio is gradually increased, so that power is gradually fed to the annulus, higher variator ratios in low regime giving a higher final drive ratio.

At an appropriate variator transmission ratio, the change is made from low regime to high regime by engaging the high regime epicyclic 10 with the final drive shaft and disengaging the low regime epicyclic 4. This change is made synchronously. That is to say that across the change the variator ratio remains substantially constant. This allows the high regime gearing 14 to be engaged with the final drive shaft before the low regime gearing 9 is disengaged, maintaining drive during the change.

To increase speed further, the variator transmission ratio is then decreased, which increases the final drive ratio, maximum final drive ratio in high regime being achieved at minimum variator ratio.

Figure 2:
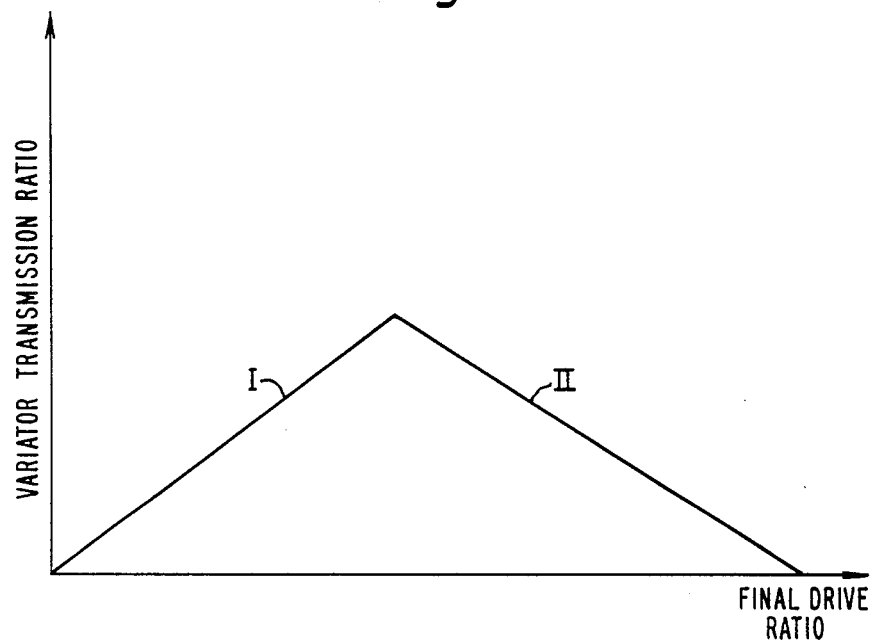
FIG. 2 is a graph.

FIG. 2 is a graph showing the relationship between the final drive ratio and the variator transmission ratio, as the vehicle moves from stationary up to high regime. The first portion, I, shows the increasing variator ratio when the transmission is in low regime. In this example the lowest variator ratio corresponds to zero final drive ratio (i.e. vehicle stationary), but it should be noted that if desired the ratios of the first epicyclic 4 may be chosen so as to include a reverse capability within low regime, avoiding the need for separate reverse gearing. The second portion, II, shows the decreasing variator ratio when the transmission is in high regime. It will be seen that a smooth, synchronous crossover is achieved between low and high regimes. If desired it is possible to choose the ratios of the first and second epicyclic so that, as well as being synchronous, the change is made such that the power passing through the variator remains substantially constant in magnitude across the change.

I claim:

1. A driveline for an engined vehicle, comprising a continuously-variable ratio transmission (1) having an input, adapted for direct drive by the engine, and an output (3), and first and second epicyclic gears (4, 10) for providing a high and low regime, each having a sun gear, a planet gear system mounted on a planet carrier and an annulus, wherein the planet carrier (6) of the first epicyclic gear and the sun gear (12) of the second epicyclic gear are directly driven by the said output of the continuously-variable ratio transmission, and, the sun gear (5) of the first epicyclic gear and the annulus (11) of the second epicyclic gear are directly driven by the engine, the annulus (7) of the first epicyclic gear providing an output in low regime, and the planet carrier (13) of the second epicyclic gear providing an output in high regime.

2. A driveline as claimed in claim 1, wherein the first and second epicyclic gears are mounted concentrically around an output shaft of the engine, which output shaft provides the drive for the input of the continuously-variable ratio transmission, the sun gear of the first epicyclic, and the annulus of the second epicyclic.

3. A driveline as claimed in claim 1, wherein the outputs in high and low regime are selectively coupled to a final drive shaft and a shift between high and low regime is made synchronously.

4. A driveline as claimed in claim 2, wherein the engine output shaft extends beyond the epicyclics, thereby to provide a power take off.

5. A driveline as claimed in claim 1, wherein the said first epicyclic is a positive ratio compound epicyclic gear.

6. A driveline as claimed in claim 1, wherein the said second epicyclic is a simple epicyclic gear.

7. A driveline as claimed in claim 1, including a reverse speed facility provided by a clutch and reverse gearing included in the driveline.

8. A driveline as claimed in claim 1, wherein the first epicyclic gearing in low regime is such as to provide a forward speed, neutral or a reverse speed in dependence upon the variator ratio.

9. A driveline as claimed in claim 1, wherein the continuously-variable ratio transmission is of the toroidal race-rolling traction type.

10. A driveline for an engined vehicle, comprising a final drive output (8), a continuously-variable ratio transmission (1) having an input adapted for direct connection to the engine and an output (3), and first and second epicyclic gears (4, 10) for providing a high and low regime, each having a sun gear, a planet gear system mounted on a planet carrier and an annulus, wherein the planet carrier (6) of the first epicyclic gear and the sun gear (12) of the second epicyclic gear are driven by the said output of the continuously-variable ratio transmission, and the sun gear (5) of the first epicyclic gear and the annulus (11) of the second epicyclic gear are driven by the engine, the annulus (7) of the first epicyclic gear being capable of rotating out-of-synchronism with said planet carrier (13) of said second epicyclic gear and having means of connection with said final drive output in low regime, and the planet carrier (13) of the second epicyclic gear having means of connection with said final drive output in high regime.

11. A driveline for an engined vehicle, comprising a continuously-variable ratio transmission (1) having an input directly driven by the engine and an output (3), and first and second epicyclic gears (4, 10) for providing a high and low regime, each having a sun gear, a planet gear system mounted on a planet carrier and an annulus, wherein the planet carrier (6) of the first epicyclic gear and the sun gear (12) of the second epicyclic gear are directly driven by the said output of the continuously-variable ratio transmission, and, the sun gear (5) of the first epicyclic gear and the annulus (11) of the second epicyclic gear are directly driven by the engine, the annulus (7) of the first epicyclic gear providing an output in low regime, and the planet carrier (13) of the second epicyclic gear providing an output in high regime.

* * * * *